US012526781B2

(12) United States Patent
Zhang

(10) Patent No.: US 12,526,781 B2
(45) Date of Patent: *Jan. 13, 2026

(54) METHOD AND DEVICE IN UE AND BASE STATION USED FOR WIRELESS COMMUNICATION

(71) Applicant: Apogee Networks, LLC, Dallas, TX (US)

(72) Inventor: Xiaobo Zhang, Shanghai (CN)

(73) Assignee: Apogee Networks, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,124

(22) Filed: Jun. 20, 2024

(65) Prior Publication Data

US 2024/0340869 A1 Oct. 10, 2024

Related U.S. Application Data

(63) Continuation of application No. 17/535,589, filed on Nov. 25, 2021, now Pat. No. 12,047,921, which is a
(Continued)

(51) Int. Cl.
*G06Q 40/04* (2012.01)
*G01S 19/13* (2010.01)
(Continued)

(52) U.S. Cl.
CPC ......... *H04W 72/0446* (2013.01); *G01S 19/13* (2013.01); *G06Q 20/3224* (2013.01);
(Continued)

(58) Field of Classification Search
CPC ... H04B 7/0695; H04B 7/0408; H04W 12/63; H04W 4/80; G07C 2209/63; H04L 5/0044
See application file for complete search history.

(56) References Cited

U.S. PATENT DOCUMENTS 10,103,797 B2    10/2018  Davydov et al.
11,224,041 B2 *  1/2022   Zhang ............... H04W 72/0446
(Continued)

FOREIGN PATENT DOCUMENTS

CN    101507140 A    8/2009
CN    104115433 A    10/2014
(Continued)

OTHER PUBLICATIONS

TSG-RAN WG1 Meeting#86bis, R1-1608737 Title:On remaining issues for hybrid CSI (Year: 2016).*
(Continued)

*Primary Examiner* — Faruk Hamza
*Assistant Examiner* — Abusayeed M Haque
(74) *Attorney, Agent, or Firm* — Volpe Koenig

(57) ABSTRACT

The disclosure provides a method and a device in a User Equipment (UE) and a base station used for wireless communication. The UE receives first information and second information, and receives a first radio signal in a first time interval. The first information and the second information are used for determining a first parameter and a second parameter respectively, the first parameter and the second parameter are used for multi-antenna related receptions respectively; the second parameter is used for a reception of a second radio signal; if a time-domain resource occupied by the second radio signal comprises the first time interval, the second parameter is used for a reception of the first radio signal, otherwise, the first parameter is used for a reception of the first radio signal. The disclosure can solve the conflict of beam scheduling and increase the flexibility of beam scheduling.

20 Claims, 9 Drawing Sheets

Related U.S. Application Data continuation of application No. 16/802,583, filed on Feb. 27, 2020, now Pat. No. 11,224,041, which is a continuation of application No. PCT/CN2017/099540, filed on Aug. 29, 2017.

(51) Int. Cl.
| | |
|---|---|
| *G06Q 20/32* | (2012.01) |
| *G06Q 20/38* | (2012.01) |
| *G07C 9/28* | (2020.01) |
| *H04L 5/00* | (2006.01) |
| *H04L 9/32* | (2006.01) |
| *H04W 4/02* | (2018.01) |
| *H04W 72/0446* | (2023.01) |
| *H04W 4/80* | (2018.01) |
| *H04W 12/63* | (2021.01) |

(52) U.S. Cl.
CPC ....... *G06Q 20/3276* (2013.01); *G06Q 20/385* (2013.01); *G07C 9/28* (2020.01); *H04L 5/0053* (2013.01); *H04L 9/3213* (2013.01); *H04W 4/023* (2013.01); *G07C 2209/63* (2013.01); *H04W 4/80* (2018.02); *H04W 12/63* (2021.01)

(56) References Cited

U.S. PATENT DOCUMENTS

| | | | |
|---|---|---|---|
| 12,047,921 B2 * | 7/2024 | Zhang | G07C 9/28 |
| 2013/0215844 A1 | 8/2013 | Seol | |
| 2014/0269454 A1 | 9/2014 | Papasakellariou | |
| 2015/0180625 A1 | 6/2015 | Park et al. | |
| 2015/0271814 A1 | 9/2015 | Park | |
| 2016/0065258 A1 | 3/2016 | Lee | |
| 2016/0345206 A1 | 11/2016 | Yerramalli et al. | |
| 2017/0099656 A1 | 4/2017 | Seo | |
| 2017/0111094 A1 * | 4/2017 | Sartori | H04B 7/0695 |
| 2017/0142694 A1 * | 5/2017 | Yerramalli | H04L 1/1861 |
| 2017/0192694 A1 | 7/2017 | Alshinnawi et al. | |
| 2017/0273058 A1 | 9/2017 | Agiwal et al. | |
| 2017/0366311 A1 | 12/2017 | Iyer et al. | |
| 2018/0098234 A1 | 4/2018 | Kim et al. | |
| 2018/0220419 A1 | 8/2018 | Takeda et al. | |
| 2018/0255543 A1 | 9/2018 | Takeda et al. | |
| 2019/0159209 A1 | 5/2019 | Xiao et al. | |
| 2019/0173553 A1 | 6/2019 | Park et al. | |
| 2019/0296956 A1 | 9/2019 | John Wilson et al. | |
| 2020/0154402 A1 | 5/2020 | Lee et al. | |
| 2020/0230808 A1 | 7/2020 | Simaan et al. | |
| 2020/0367251 A1 * | 11/2020 | Saito | H04W 72/53 |
| 2021/0105122 A1 | 4/2021 | Xiong et al. | |
| 2021/0120524 A1 | 4/2021 | Palle et al. | |
| 2021/0153279 A1 | 5/2021 | Takeda et al. | |
| 2022/0116882 A1 * | 4/2022 | Guo | H04W 52/242 |
| 2022/0124660 A1 | 4/2022 | Cheng et al. | |
| 2022/0295530 A1 | 9/2022 | Lee et al. | |
| 2022/0304037 A1 | 9/2022 | Zhang et al. | |
| 2022/0330298 A1 | 10/2022 | Cheng et al. | |
| 2022/0345195 A1 | 10/2022 | Jang et al. | |

FOREIGN PATENT DOCUMENTS

| | | | | |
|---|---|---|---|---|
| CN | 104137437 A | 11/2014 | | |
| CN | 104137440 A | 11/2014 | | |
| CN | 105324944 A | 2/2016 | | |
| CN | 106031053 A | 10/2016 | | |
| CN | 106330789 A | 1/2017 | | |
| CN | 106576276 A | 4/2017 | | |
| CN | 106998558 A | 8/2017 | | |
| WO | WO-2014007539 A1 * | 1/2014 | ........... | H04L 5/0023 |
| WO | WO-2017076090 A1 * | 5/2017 | ............ | H04W 72/23 |
| WO | WO-2017218785 A1 * | 12/2017 | ............. | H04W 4/70 |
| WO | 2018017163 A1 | 1/2018 | | |

OTHER PUBLICATIONS

Supplementary Search Report of Chinese patent application No. CN202111039436.8 dated Jun. 20, 2024.
Notification to Grant Patent Right for Invention of Chinese patent application No. CN202111039436.8 dated Jul. 1, 2024.
ZTE "On CSI-RS for beam management" 3GPP TSG WG1 Meeting #90.R1-1712304, Aug. 25, 2017.
Samsung "On Beam Indication" 3GPP TSG RAN WG1 NR#90, R1-1713595, Aug. 25, 2017.
First Office Action received in application No. CN201780093002.1 dated Jun. 30, 2021.
First Search Report received in application No. CN201780093002.1 dated Jun. 24, 2021.
CN201780093002.1 Notification to Grant Patent Right for Invention dated Sep. 3, 2021.
The extended European search report in application EP17923680.7 dated May 28, 2020.
First Office Action received in application No. IN202017010124 dated Mar. 30, 2021.
ISR received in application No. PCT/CN2017/099540 dated May 9, 2018.
ZTE et al: "Discussion on downlink DMRS design", 3GPPDRAFT; R1-1700135Discussion on Downlink DMRS Design, 3rd Generation Partnership Project (3GPP) Jan. 16-20, 2017.
ZTE "Resource sharing between PDCCH and PDSCH" 3GPP TSG RAN WG1 Meeting #88bis R1-1704371 Apr. 2017.
Huawei et al: "Resourcesharing between NR-PDCCHand data", 3GPP Draft; R1-1713741, 3rd Generation Partnership Project(3GPP), Aug. 21-25, 2017.
First Office Action of Chinese patent application No. CN202111039436.8 dated Jan. 27, 2024.
First Search Report of Chinese patent application No. CN202111039436.8 dated Jan. 24, 2024.
Third Generation Partnership Project, "Technical Specification Group Radio Access Network; NR; Multiplexing and channel coding (Release 15)," 3GPP TS 38.212 V0.0.2 (Aug. 2017).
Third Generation Partnership Project, "Technical Specification Group Radio Access Network; NR; Physical layer procedures for control (Release 15)," 3GPP TS 38.213 V0.1.0 (Aug. 2017).
Third Generation Partnership Project, "Technical Specification Group Radio Access Network; NR; Physical layer procedures for data (Release 15)," 3GPP TS 38.214 V0.1.0 (Aug. 2017).
Third Generation Partnership Project, "Technical Specification Group Radio Access Network; NR; Radio Resource Control (RRC); Protocol specification (Release 15)," 3GPP TS 38.331 V0.0.5 (Aug. 2017).

* cited by examiner

METHOD AND DEVICE IN UE AND BASE STATION USED FOR WIRELESS COMMUNICATION

CROSS-REFERENCE TO RELATED APPLICATION

This application is a continuation of the U.S. patent application Ser. No. 17/535,589, filed on Nov. 25, 2021, and is a continuation of the U.S. patent application Ser. No. 16/802,583, filed on Feb. 27, 2020, which is a continuation of International Application No. PCT/CN2017/099540, filed Aug. 29, 2017, the full disclosure of which is incorporated herein by reference.

BACKGROUND

Technical Field

The disclosure relates to transmission schemes of radio signals in wireless communication systems, and in particular to a method and a device for multi-antenna transmission.

Related Art

Massive Multi-Input Multi-Output (MIMO) becomes a research hotspot of next-generation mobile communications. In the massive MIMO, multiple antennas experience beamforming to form a relatively narrow beam which points to a particular direction to improve the quality of communication. A base station and a User Equipment (UE) can perform analog beamforming at a Radio Frequency (RF) end to realize a narrow beam with a low RF link cost.

In 3rd Generation Partner Project (3GPP) New Radio discussions, there is some company proposing that, in downlink transmission, a base station needs to indicate to a UE in advance a beam used for receiving a Channel State Information Reference Signal (CSI-RS) and a beam used for data transmission respectively, so that the UE performs receptions using corresponding analog beams.

SUMMARY

The inventor finds through researches that the scheme in which beams used for CSI-RS and data transmission are indicated respectively may cause the following: beam indicators corresponding to CSI-RS reception and data reception are not aligned, while the CSI-RS and the data are frequency-domain multiplexed on a same multicarrier symbol; thus, the UE cannot determine which beam indicator is used for receiving the corresponding multicarrier symbol.

In view of the above problems, the disclosure provides a solution. It should be noted that the embodiments of the disclosure and the characteristics in the embodiments may be mutually combined if no conflict is caused. For example, the embodiments of the UE of the disclosure and the characteristics in the embodiments may be applied to the base station, and vice versa.

The disclosure provides a method in a UE for wireless communication. The method includes:
 receiving first information and second information; and
 receiving a first radio signal in a first time interval.
Herein, the first information and the second information are used for determining a first parameter and a second parameter respectively, the first parameter and the second parameter are used for multi-antenna related receptions respectively; the second parameter is used for a reception of a second radio signal; if a time-domain resource occupied by the second radio signal includes the first time interval, the second parameter is used for a reception of the first radio signal, otherwise, the first parameter is used for a reception of the first radio signal.

In one embodiment, the above method has the following benefits: by setting beam information indicator rules, the disclosure solves the problem of which beam indicator information is employed when the UE receives different types of radio signals on a same multicarrier symbol, thus the flexibility of beam scheduling is increased.

In one embodiment, the first information is carried by a higher layer signaling.

In one embodiment, the first information is carried by a Radio Resource Control (RRC) signaling.

In one embodiment, one Information Element (RRC IE) includes the first information.

In one embodiment, the first information is carried by a Medium-Access Control Control Element (MAC CE).

In one embodiment, the first information is transmitted on a physical layer shared channel.

In one embodiment, the first information is carried by a physical layer signaling.

In one embodiment, one piece of Downlink Control Information (DCI) includes the first information.

In one embodiment, the first information is transmitted on a physical layer control channel.

In one embodiment, the UE obtains the first information through a blind detection.

In one embodiment, the first information is configured semi-statically.

In one embodiment, the first information is configured dynamically.

In one embodiment, the first information is configured semi-statically, and the second information is configured dynamically.

In one embodiment, the first information is configured dynamically, and the second information is configured semi-statically.

In one embodiment, the second information is carried by a higher layer signaling.

In one embodiment, the second information is carried by an RRC signaling.

In one embodiment, one RRC IE includes the second information.

In one embodiment, the second information is carried by an MAC CE.

In one embodiment, the second information is transmitted on a physical layer shared channel.

In one embodiment, the second information is carried by a physical layer signaling.

In one embodiment, one piece of DCI includes the second information.

In one embodiment, the second information is transmitted on a physical layer control channel.

In one embodiment, the UE obtains the second information through a blind detection.

In one embodiment, the second information is configured semi-statically.

In one embodiment, the second information is configured dynamically.

In one embodiment, the first information and the second information are transmitted in different time-domain resources.

In one embodiment, the second information is transmitted after the first information.

In one embodiment, the first time interval is a multicarrier symbol.

In one embodiment, the multicarrier symbol is one Orthogonal Frequency Division Multiplexing (OFDM) symbol.

In one embodiment, the multicarrier symbol is one Filter Bank Multiple Carrier (FBMC) symbol.

In one embodiment, the first time interval is composed of multiple multicarrier symbols.

In one embodiment, the first time interval is composed of multiple consecutive multicarrier symbols.

In one embodiment, the first radio signal is CSI-RS.

In one embodiment, the first radio signal is CSI-RS included in one CSI-RS resource.

In one embodiment, the first radio signal is one part of one CSI-RS.

In one embodiment, the first radio signal is one Demodulation Reference Signal (DMRS).

In one embodiment, the first radio signal is one part of one DMRS.

In one embodiment, the first radio signal is data.

In one embodiment, time-frequency resources occupied by the first radio signal are one part of one physical layer downlink shared channel.

In one embodiment, time-frequency resources occupied by the first radio signal are one part of one physical layer downlink data channel.

In one embodiment, the second radio signal is CSI-RS.

In one embodiment, the second radio signal is CSI-RS included in one CSI-RS resource.

In one embodiment, the second radio signal is one DMRS.

In one embodiment, the second radio signal is data.

In one embodiment, the second radio signal is a radio signal carried by one physical layer downlink shared channel.

In one embodiment, the second radio signal is a radio signal carried by one physical layer downlink data channel.

In one embodiment, the phrase used for determining refers to explicitly indicating.

In one embodiment, the phrase used for determining refers to implicitly indicating.

In one embodiment, the first parameter is different from the second parameter.

In one embodiment, the first parameter and the second parameter are used for generating spatial receiving parameters respectively.

In one embodiment, the first parameter and the second parameter are used for generating analog receiving beamforming vectors respectively.

In one embodiment, the first parameter and the second parameter are a spatial receiving parameter used for receiving a first reference signal and a spatial receiving parameter used for receiving a second reference signal respectively. The first reference signal and the second reference signal are transmitted before the first information and the second information respectively.

In one embodiment, the first parameter and the second parameter are parameters indicating spatial Quasi Co-location (QCL) with a first reference signal and indicating spatial QCL with a second reference signal respectively.

In one embodiment, the phrase that two radio signals are spatially Quasi Co-located (QCLed) refers that the channels through which the two radio signals pass have approximate values in at least one of average delay, delay spread, Doppler shift, Doppler spread or spatial receiving parameter.

In one embodiment, the spatial receiving parameter includes a parameter that a receiver applies to a phase shifter to control a spatial receiving direction.

In one embodiment, the spatial receiving parameter includes a spacing between receiving antenna elements in working state.

In one embodiment, the spatial receiving parameter includes a number of receiving antenna elements in working state.

In one embodiment, the spatial receiving parameter includes a selection of receiving antenna array.

In one embodiment, the second parameter is a spatial receiving parameter for the second radio signal.

In one embodiment, the second parameter is a spatial receiving parameter of the UE for the second radio signal.

In one embodiment, the second parameter is a spatial receiving parameter of other UEs for the second radio signal.

In one embodiment, a time-domain resource occupied by the second radio signal includes the first time interval, and the second parameter is used for determining a spatial receiving parameter for the first radio signal.

In one subembodiment, a same spatial receiving parameter is used for receiving the first radio signal and the second radio signal.

In one subembodiment, a time-domain resource occupied by the second radio signal includes multiple multicarrier symbols, and the first time interval is one of the multiple multicarrier symbols.

In one subembodiment, a time-domain resource occupied by the second radio signal is the first time interval.

In one subembodiment, a time-domain resource occupied by the second radio signal includes the first time interval, and the second parameter is used for determining an analog receiving beam for the first radio signal.

In one subembodiment, a same analog receiving beam is used for receiving the first radio signal and the second radio signal.

In one embodiment, a time-domain resource occupied by the second radio signal does not comprise the first time interval, the first parameter is used for determining a spatial receiving parameter for the first radio signal, and the second parameter is used for determining a spatial receiving parameter for the second radio signal.

In one subembodiment, the spatial receiving parameter for the first radio signal is different from the spatial receiving parameter for the second radio signal.

In one embodiment, a time-domain resource occupied by the second radio signal does not comprise the first time interval, the first parameter is used for determining an analog receiving beam for the first radio signal, and the second parameter is used for determining an analog receiving beam for the second radio signal.

In one subembodiment, the analog receiving beam for the first radio signal is different from the analog receiving beam for the second radio signal.

In one embodiment, a phase parameter configured on a phase shifter of a receiver RF part is used for forming an analog receiving beam.

In one embodiment, the first radio signal includes data, and the second radio signal is not used for demodulation of data included in the first radio signal.

In one embodiment, the second radio signal includes data, and the first radio signal is not used for demodulation of data included in the second radio signal.

In one embodiment, a time-domain resource of the second radio signal includes the first time interval, frequency-domain resources occupied by the first radio signal and the second radio signal in the first time interval are orthogonal in frequency domain.

In one embodiment, the multi-antenna related reception refers to receiving beamforming.

In one embodiment, the multi-antenna related reception refers to analog receiving beamforming.

In one embodiment, the multi-antenna related reception refers to a spatial receiving parameter.

According to one aspect of the disclosure, the method includes:

receiving the second radio signal.

Herein, a time-domain resource occupied by the second radio signal includes the first time interval, or a time-domain resource occupied by the second radio signal does not include the first time interval.

In one embodiment, the UE receives the second radio signal, and the second parameter is a spatial receiving parameter for the second radio signal.

In one embodiment, the UE receives the second radio signal, a time-domain resource occupied by the second radio signal includes the first time interval, and the second parameter is a spatial receiving parameter for the first radio signal.

In one embodiment, the UE receives the second radio signal, a time-domain resource occupied by the second radio signal does not include the first time interval, the first parameter is a spatial receiving parameter for the first radio signal, and the second parameter is a spatial receiving parameter for the second radio signal.

According to one aspect of the disclosure, the first radio signal is a reference signal, and the second radio signal includes data.

In one embodiment, the above method has the following benefits: when CSI-RS and data are received on a same multicarrier symbol, an indicator used for indicating a spatial receiving parameter to receive the data is also used for indicating a spatial receiving parameter to receive the CSI-RS.

In one embodiment, the first radio signal is a CSI-RS.

In one embodiment, the first radio signal is a periodic CSI-RS.

In one embodiment, the first radio signal is an aperiodic CSI-RS.

In one embodiment, the first radio signal is a semi-periodic CSI-RS.

In one embodiment, the first radio signal includes a CSI-RS.

In one embodiment, the first radio signal is used for determining a CSI.

In one embodiment, a dynamic signaling is used for triggering the first radio signal.

In one embodiment, a DCI is used for triggering the first radio signal.

In one embodiment, an MAC CE is used for triggering the first radio signal.

In one embodiment, the second radio signal is transmitted on a downlink shared channel.

In one embodiment, the second radio signal is transmitted on a downlink data channel.

In one embodiment, the second radio signal is transmitted on a Physical Downlink Shared Channel (PDSCH).

In one embodiment, the second radio signal is transmitted on an short PDSCH (sPDSCH).

In one embodiment, the second radio signal includes a DMRS.

In one embodiment, the first radio signal is not used for demodulation of data included in the second radio signal.

In one embodiment, the first radio signal is used for selecting a transmitting beam.

In one embodiment, the first radio signal is used for selecting a receiving beam.

In one embodiment, the first information is configured semi-statically, and the second information is configured dynamically.

According to one aspect of the disclosure, the first radio signal includes data and the second radio signal is a reference signal.

In one embodiment, the above method has the following benefits: when CSI-RS and data are received on a same multicarrier symbol, an indicator used for indicating a spatial receiving parameter to receive the CSI-RS is also used for indicating a spatial receiving parameter to receive the data.

In one embodiment, the first radio signal is transmitted on a downlink shared channel.

In one embodiment, the first radio signal is transmitted on a downlink data channel.

In one embodiment, the second radio signal is a CSI-RS.

In one embodiment, the second radio signal is a periodic CSI-RS.

In one embodiment, the second radio signal is an aperiodic CSI-RS.

In one embodiment, the second radio signal is a semi-periodic CSI-RS.

In one embodiment, a dynamic signaling is used for triggering the second radio signal.

In one embodiment, a DCI is used for triggering the second radio signal.

In one embodiment, an MAC CE is used for triggering the second radio signal.

In one embodiment, the second radio signal includes N radio sub-signals, the N being a positive integer greater than 1.

In one subembodiment, different transmitting beams are used for transmitting the N radio sub-signals, and a same spatial receiving parameter is used for receiving the N radio sub-signals.

In one embodiment, the second radio signal is not used for demodulation of data included in the first radio signal.

In one embodiment, the second radio signal is used for selecting a transmitting beam.

In one embodiment, the second radio signal is used for selecting a receiving beam.

In one embodiment, the first information is configured dynamically, and the second information is configured semi-statically.

According to one aspect of the disclosure, the method includes:

receiving a downlink signaling.

Herein, the downlink signaling is used for determining that the first radio signal is a reference signal and the second radio signal includes data, or the downlink signaling is used for determining that the first radio signal includes data and the second radio signal is a reference signal.

In one embodiment, the above method has the following benefits: signaling overheads are reduced.

In one embodiment, the downlink signaling is a higher layer signaling.

In one embodiment, the downlink signaling is transmitted on a physical layer control channel.

In one embodiment, the downlink signaling is a dynamic signaling.

In one embodiment, the downlink signaling is one DCI.

In one embodiment, an MAC CE is used for carrying the downlink signaling.

According to one aspect of the disclosure, in time-domain, the second information is transmitted after the first information.

In one embodiment, the above method has the following benefits: the flexibility of system scheduling is increased.

The disclosure provides a method in a base station for wireless communication, wherein the method includes:
transmitting first information and second information; and
transmitting a first radio signal in a first time interval.

Herein, the first information and the second information are used for determining a first parameter and a second parameter respectively, the first parameter and the second parameter are used for multi-antenna related receptions respectively; the second parameter is used for a reception of a second radio signal; if a time-domain resource occupied by the second radio signal includes the first time interval, the second parameter is used for a reception of the first radio signal, otherwise, the first parameter is used for a reception of the first radio signal.

In one embodiment, the first parameter and the second parameter correspond to multi-antenna related transmissions of the base station respectively.

In one embodiment, the multi-antenna related transmission refers to transmitting beamforming.

In one embodiment, the multi-antenna related transmission refers to analog transmitting beamforming.

In one embodiment, the multi-antenna related transmission refers to a spatial transmitting parameter.

In one embodiment, the first parameter and the second parameter correspond to different analog transmitting beams of the base station respectively.

In one embodiment, a time-domain resource occupied by the second radio signal includes the first time interval, and a same analog transmitting beam is used for transmitting the first radio signal and the second radio signal in the first time interval.

In one embodiment, a time-domain resource occupied by the second radio signal does not include the first time interval, and different analog transmitting beams are used for transmitting the first radio signal and the second radio signal.

In one embodiment, the second information is used for determining a second reference signal, a spatial transmitting parameter used for transmitting the second reference signal is used for transmitting the second radio signal, and a spatial receiving parameter used for receiving the second reference signal is used for receiving the second radio signal.

In one subembodiment, a time-domain resource occupied by the second radio signal includes the first time interval, a spatial transmitting parameter used for transmitting the second reference signal is used for transmitting the first radio signal and the second radio signal, and a spatial receiving parameter used for receiving the second reference signal is used for receiving the first radio signal and the second radio signal.

In one embodiment, a time-domain resource occupied by the second radio signal does not include the first time interval, the first parameter is used for determining a first reference signal, a spatial transmitting parameter used for transmitting the first reference signal is used for transmitting the first radio signal, and a spatial receiving parameter used for receiving the first reference signal is used for receiving the first radio signal.

In one embodiment, the spatial transmitting parameter includes a parameter that a transmitter applies to a phase shifter to control a spatial transmitting direction.

In one embodiment, the spatial transmitting parameter includes a spacing between transmitting antenna elements in working state.

In one embodiment, the spatial transmitting parameter includes a number of transmitting antenna elements in working state.

In one embodiment, the spatial transmitting parameter includes a selection of transmitting antenna array.

In one embodiment, a phase parameter configured on a phase shifter of a transmitter RF part is used for forming an analog transmitting beam.

According to one aspect of the disclosure, the method includes:
transmitting the second radio signal.

Herein, a time-domain resource occupied by the second radio signal includes the first time interval, or a time-domain resource occupied by the second radio signal does not include the first time interval.

According to one aspect of the disclosure, the first radio signal is a reference signal, and the second radio signal includes data.

According to one aspect of the disclosure, the first radio signal includes data, and the second radio signal is a reference signal.

According to one aspect of the disclosure, the method includes:
transmitting a downlink signaling.

Herein, the downlink signaling is used for determining that the first radio signal is a reference signal and the second radio signal includes data, or the downlink signaling is used for determining that the first radio signal includes data and the second radio signal is a reference signal.

According to one aspect of the disclosure, in time domain, the second information is transmitted after the first information.

The disclosure provides a UE for wireless communication, wherein the UE includes the following:
a first receiver, to receive first information and second information; and
a second receiver, to receive a first radio signal in a first time interval.

Herein, the first information and the second information are used for determining a first parameter and a second parameter respectively, the first parameter and the second parameter are used for multi-antenna related receptions respectively; the second parameter is used for a reception of a second radio signal; if a time-domain resource occupied by the second radio signal includes the first time interval, the second parameter is used for a reception of the first radio signal, otherwise, the first parameter is used for a reception of the first radio signal.

In one embodiment, the above UE is characterized in that: the second receiver receives the second radio signal; wherein a time-domain resource occupied by the second radio signal includes the first time interval, or a time-domain resource occupied by the second radio signal does not include the first time interval.

In one embodiment, the above UE is characterized in that: the first radio signal is a reference signal and the second radio signal includes data.

In one embodiment, the above UE is characterized in that: the first radio signal includes data and the second radio signal is a reference signal.

In one embodiment, the above UE is characterized in that: the first receiver receives a downlink signaling; wherein the downlink signaling is used for determining that the first radio signal is a reference signal and the second radio signal includes data, or the downlink signaling is used for determining that the first radio signal includes data and the second radio signal is a reference signal.

In one embodiment, the above UE is characterized in that: in time domain, the second information is transmitted after the first information.

The disclosure provides a base station for wireless communication, wherein the base station includes the following:
a first transmitter, to transmit first information and second information; and
a second transmitter, to transmit a first radio signal in a first time interval.

Herein, the first information and the second information are used for determining a first parameter and a second parameter respectively, the first parameter and the second parameter are used for multi-antenna related receptions respectively; the second parameter is used for a reception of a second radio signal; if a time-domain resource occupied by the second radio signal includes the first time interval, the second parameter is used for a reception of the first radio signal, otherwise, the first parameter is used for a reception of the first radio signal.

In one embodiment, the above base station is characterized in that: the second transmitter transmits the second radio signal; wherein a time-domain resource occupied by the second radio signal includes the first time interval, or a time-domain resource occupied by the second radio signal does not include the first time interval.

In one embodiment, the above base station is characterized in that: the first radio signal is a reference signal and the second radio signal includes data.

In one embodiment, the above base station is characterized in that: the first radio signal includes data and the second radio signal is a reference signal.

In one embodiment, the above base station is characterized in that: the first transmitter transmits a downlink signaling; wherein the downlink signaling is used for determining that the first radio signal is a reference signal and the second radio signal includes data, or the downlink signaling is used for determining that the first radio signal includes data and the second radio signal is a reference signal.

In one embodiment, the above base station is characterized in that: in time domain, the second information is transmitted after the first information.

In one embodiment, compared with the prior art, the disclosure has the following technical advantages.

The conflict of beam scheduling is solved.

The flexibility of beam scheduling is increased.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if no conflict is caused.

Embodiment 1

Figure 1:
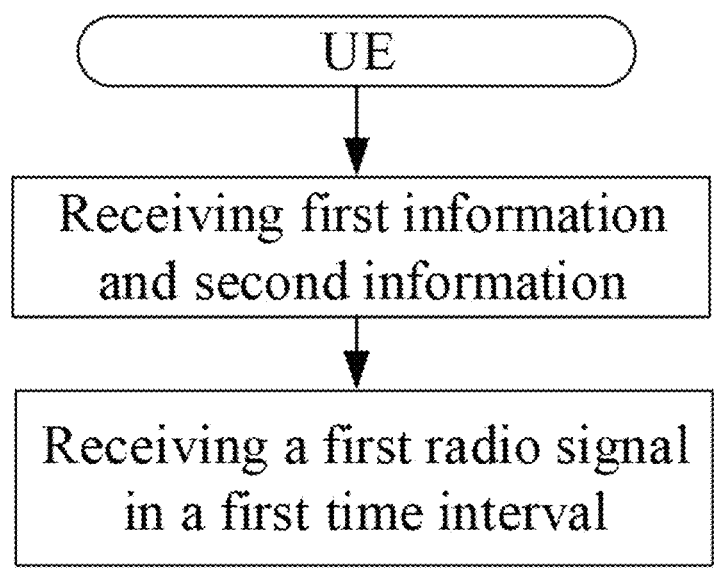
FIG. 1 is a flowchart of first information, second information and a first radio signal according to one embodiment of the disclosure.

Embodiment 1 illustrates an example of a flowchart of transmission of first information, second information and a first radio signal according to the disclosure, as shown in FIG. 1.

In FIG. 1, each box represents one step. In Embodiment 1, the UE in the disclosure, in turn, receives first information and second information, and receives a first radio signal in a first time interval; wherein the first information and the second information are used for determining a first parameter and a second parameter respectively, the first parameter and the second parameter are used for multi-antenna related receptions respectively; the second parameter is used for a reception of a second radio signal; if a time-domain resource occupied by the second radio signal includes the first time interval, the second parameter is used for a reception of the first radio signal, otherwise, the first parameter is used for a reception of the first radio signal.

In one embodiment, the first parameter and the second parameter are used for generating spatial receiving parameters respectively.

In one embodiment, the first parameter and the second parameter are used for generating analog receiving beams respectively.

In one embodiment, the first information and the second information are transmitted on physical layer control channels respectively.

In one embodiment, the first time interval is one OFDM symbol.

In one embodiment, a time-domain resource occupied by the second radio signal includes multiple OFDM symbols.

In one embodiment, the first information and the second information are on different DCIs.

In one embodiment, the second information is transmitted after the first information.

In one embodiment, the first radio signal is a reference signal, and the second radio signal includes data.

In one embodiment, a time-domain resource occupied by the second radio signal includes the first time interval, and the second parameter is used for generating an analog receiving beam that receives the first radio signal and the second radio signal.

Embodiment 2

Figure 2:
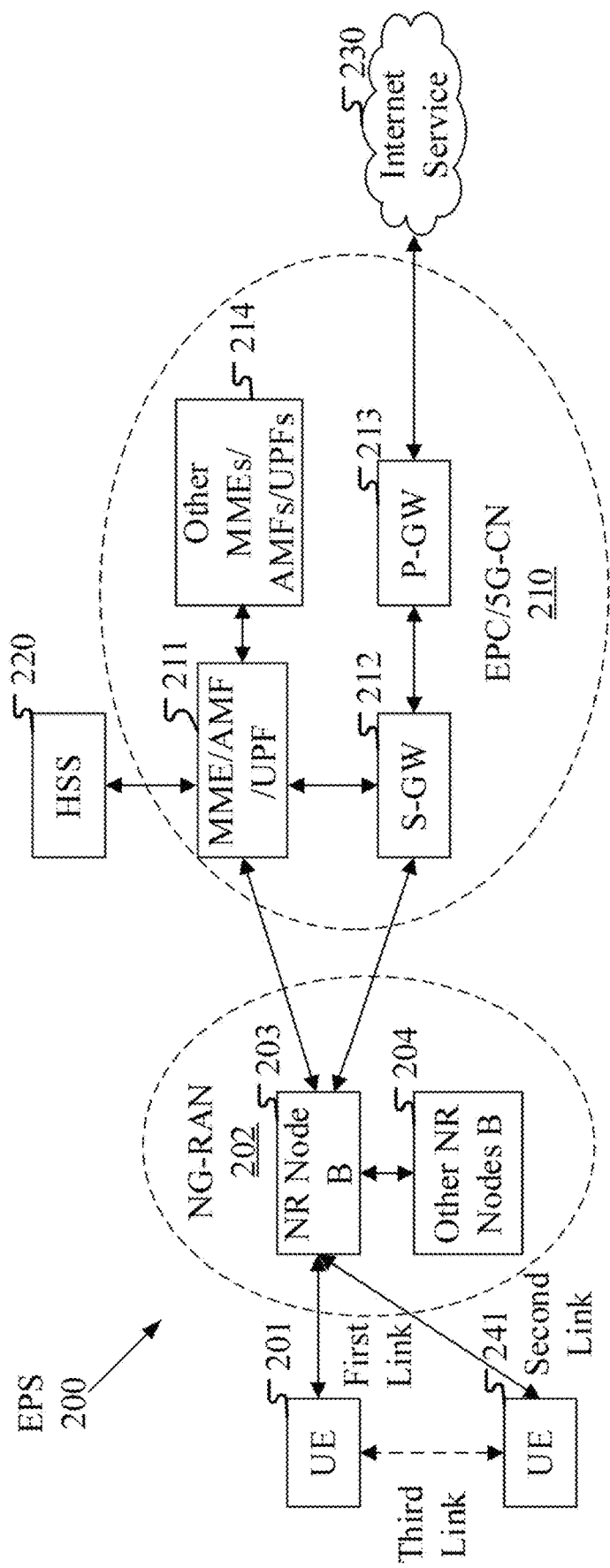
FIG. 2 is a diagram illustrating a network architecture according to one embodiment of the disclosure.

Embodiment 2 illustrates an example of a diagram of a network architecture according to the disclosure, as shown in FIG. 2. FIG. 2 is a diagram illustrating a system network architecture 200 of NR 5G, Long-Term Evolution (LTE), Long-Term Evolution Advanced (LTE-A). The NR 5G or LTE network architecture 200 may be called an Evolved Packet System (EPS) 200 or some other appropriate terms. The EPS 200 may include one or more UEs 201, an NG-RAN 202, an Evolved Packet Core/5G-Core Network (EPC/5G-CN) 210, a Home Subscriber Server (HSS) 220 and an Internet Service 230. Herein, the EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes an MME/AMF/UPF 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IMSs) and Packet Switching Streaming Services (PSSs).

In one embodiment, the UE 201 corresponds to the UE in the disclosure.

In one embodiment, the gNB 203 corresponds to the base station in the disclosure.

In one embodiment, the UE 201 supports multi-antenna transmission.

In one embodiment, the UE 201 supports analog beamforming.

In one embodiment, the gNB 203 supports multi-antenna transmission.

In one embodiment, the gNB 203 supports analog beamforming.

Embodiment 3

Figure 3:
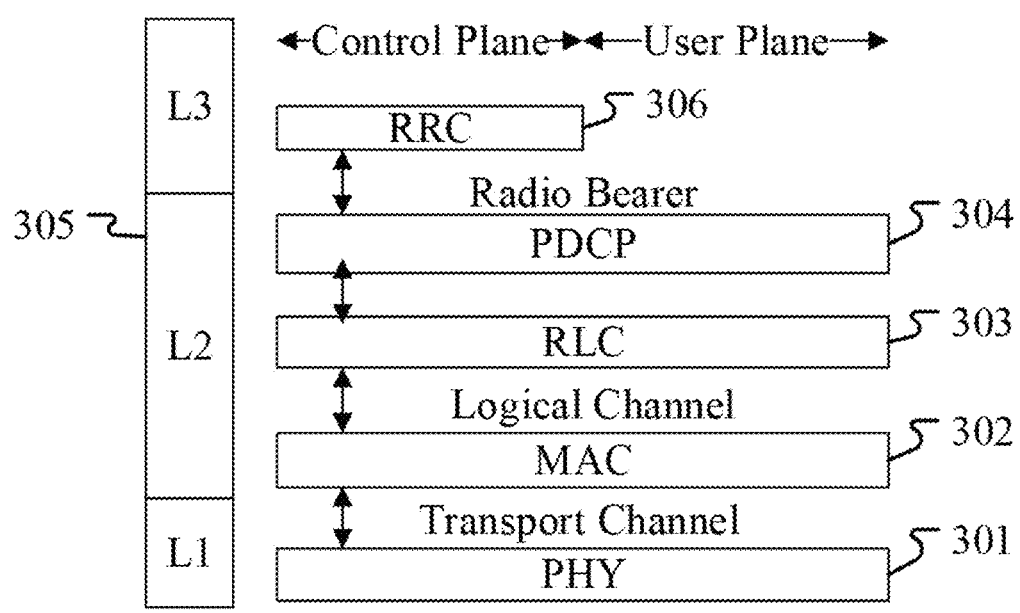
FIG. 3 is a diagram illustrating a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram of an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture in FIG. 3 is applicable to the UE in the disclosure.

In one embodiment, the radio protocol architecture in FIG. 3 is applicable to the base station in the disclosure.

In one embodiment, the first information in the disclosure is generated on the PHY 301.

In one embodiment, the second information in the disclosure is generated on the PHY 301.

In one embodiment, the first radio signal in the disclosure is generated on the PHY 301.

In one embodiment, the second radio signal in the disclosure is generated on the PHY 301.

In one embodiment, the downlink signaling in the disclosure is generated on the PHY 301.

Embodiment 4

Figure 4:
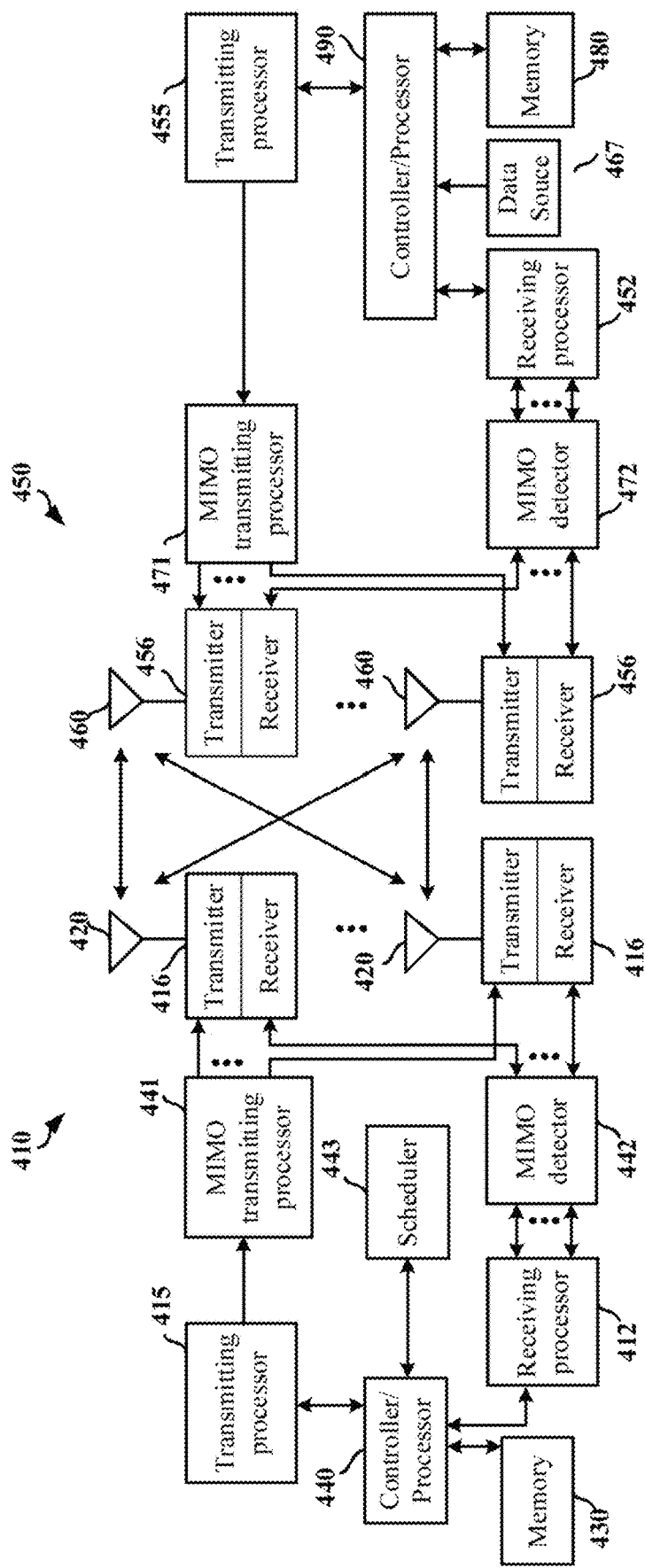
FIG. 4 is a diagram illustrating an evolved node B and a given UE according to one embodiment of the disclosure.

Embodiment 4 illustrates a diagram of an evolved node B and a given UE according to the disclosure, as shown in FIG. 4. FIG. 4 is a block diagram of a gNB 410 in communication with a UE 450 in an access network.

The base station 410 may include a controller/processor 440, a scheduler 443, a memory 430, a receiving processor 412, a transmitting processor 415, an MIMO transmitting processor 441, an MIMO detector 442, a transmitter/receiver 416 and an antenna 420.

The UE 450 may include a controller/processor 490, a memory 480, a data source 467, a transmitting processor 455, a receiving processor 452, an MIMO transmitting processor 471, an MIMO detector 472, a transmitter/receiver 456 and an antenna 460.

In Downlink (DL) transmission, processes relevant to the base station 410 include the following.

A higher-layer packet is provided to the controller/processor 440. The controller/processor 440 provides header compression, encryption, packet segmentation and reordering, multiplexing and de-multiplexing between a logical channel and a transport channel, to implement the L2 protocol used for the user plane and the control plane. The higher-layer packet may include data or control information, for example, Downlink Shared Channel (DL-SCH).

The controller/processor 440 may be connected to the memory 430 that stores program code and data. The memory 430 may be a computer readable medium.

The controller/processor 440 notifies the scheduler 443 of a transmission requirement, the scheduler 443 is configured to schedule an air-interface resource corresponding to the transmission requirement and notify the scheduling result to the controller/processor 440.

The controller/processor 440 transmits, to the transmitting processor 415, the control information for downlink transmission obtained when the receiving processor 412 processes uplink receiving.

The transmitting processor 415 receives a bit stream output from the controller/processor 440, and performs various signal transmitting processing functions of an L1 layer (that is, PHY), including encoding, interleaving, scrambling, modulation, power control/allocation, generation of physical layer control signaling (including PBCH, PDCCH, PHICH, PCFICH, reference signal), etc.

The MIMO transmitting processor 441 performs spatial processing (for example, multi-antenna precoding, digital beamforming) on data symbols, control symbols or reference signal symbols, and outputs a baseband signal to the transmitter 416.

The MIMO transmitting processor 441 outputs an analog transmitting beamforming vector to the transmitter 416.

The transmitter 416 is configured to convert the baseband signal provided by the MIMO transmitting processor 441 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal. Analog transmitting beamforming is processed in the transmitter 416.

In DL transmission, processes relevant to the UE 450 include the following.

The receiver 456 is configured to convert a radio-frequency signal received via the antenna 460 into a baseband signal and provide the baseband signal to the MIMO detector 472. Analog receiving beamforming is processed in the receiver 456.

The MIMO detector 472 is configured to perform an MIMO detection on the signal received from the receiver 456, and provide a baseband signal subjected to MIMO detection to the receiving processor 452.

The receiving processor 452 extracts an analog receiving beamforming related parameter and outputs to the MIMO detector 472; and the MIMO detector 472 outputs an analog receiving beamforming vector to the receiver 456.

The receiving processor 452 performs various signal receiving processing functions of an L1 layer (that is, PHY), including decoding, de-interleaving, descrambling, demodulation, extraction of physical layer control signaling, etc.

The controller/processor 490 receives a bit stream output from the receiving processor 452, and provides header decompression, decryption, packet segmentation and reordering, multiplexing and de-multiplexing between a logical channel and a transport channel, to implement the L2 protocol used for the user plane and the control plane.

The controller/processor 490 may be connected to the memory 480 that stores program code and data. The memory 480 may be a computer readable medium.

The controller/processor 490 transmits, to the receiving processor 452, the control information for downlink receiving obtained when the transmitting processor 455 processes uplink transmission.

The first information in the disclosure is generated through the transmitting processor 415. The MIMO transmitting processor 441 performs multi-antenna precoding on a baseband signal related to the first information output by the transmitting processor 415. The transmitter 416 converts the baseband signal provided by the MIMO transmitting processor 441 into a radio frequency signal, performs analog transmitting beamforming, and transmits the radio frequency signal via the antenna 420. The receiver 456 receives the radio frequency signal via the antenna 460, performs analog receiving beamforming, obtains a radio frequency signal related to the first information, and converts the radio frequency signal into a baseband signal and provides the baseband signal to the MIMO detector 472. The MIMO detector 472 performs an MIMO detection on the signal received from the receiver 456. The receiving processor 452 processes the baseband signal output by the MIMO detector 472 to obtain the first information.

The second information in the disclosure is generated through the transmitting processor 415. The MIMO transmitting processor 441 performs multi-antenna precoding on a baseband signal related to the second information output by the transmitting processor 415. The transmitter 416 converts the baseband signal provided by the MIMO transmitting processor 441 into a radio frequency signal, performs analog transmitting beamforming, and transmits the radio frequency signal via the antenna 420. The receiver 456 receives the radio frequency signal via the antenna 460, performs analog receiving beamforming, obtains a radio frequency signal related to the second information, and converts the radio frequency signal into a baseband signal and provides the baseband signal to the MIMO detector 472. The MIMO detector 472 performs an MIMO detection on the signal received from the receiver 456. The receiving processor 452 processes the baseband signal output by the MIMO detector 472 to obtain the second information.

The first radio signal in the disclosure is generated through the transmitting processor 415. The MIMO transmitting processor 441 performs multi-antenna precoding on a baseband signal related to the first radio signal output by the transmitting processor 415. The transmitter 416 converts the baseband signal provided by the MIMO transmitting processor 441 into a radio frequency signal, performs analog transmitting beamforming, and transmits the radio frequency signal via the antenna 420. The receiver 456 receives the radio frequency signal via the antenna 460, performs analog receiving beamforming, obtains a radio frequency signal related to the first radio signal, and converts the radio frequency signal into a baseband signal and provides the baseband signal to the MIMO detector 472. The MIMO detector 472 performs an MIMO detection on the signal received from the receiver 456. The receiving processor 452 processes the baseband signal output by the MIMO detector 472 to obtain the first radio signal, or the receiving processor 452 performs channel measurement on the baseband signal output by the MIMO detector 472.

The second radio signal in the disclosure is generated through the transmitting processor 415. The MIMO transmitting processor 441 performs multi-antenna precoding on a baseband signal related to the second radio signal output by the transmitting processor 415. The transmitter 416 converts the baseband signal provided by the MIMO transmitting processor 441 into a radio frequency signal, performs analog transmitting beamforming, and transmits the radio frequency signal via the antenna 420. The receiver 456 receives the radio frequency signal via the antenna 460, performs analog receiving beamforming, obtains a radio frequency signal related to the second radio signal, and converts the radio frequency signal into a baseband signal and provides the baseband signal to the MIMO detector 472. The MIMO detector 472 performs an MIMO detection on the signal received from the receiver 456. The receiving processor 452 processes the baseband signal output by the MIMO detector 472 to obtain the second radio signal, or the receiving processor 452 performs channel measurement on the baseband signal output by the MIMO detector 472.

In one embodiment, a time-domain resource of the second radio signal includes the first time interval, the receiving processor 452 extracts the second information and outputs to the MIMO detector 472, the MIMO detector 472 generates, according to the second information, the second parameter used for generating an analog receiving beam, and outputs to the receiver 456, and the receiver 456 generates an analog receiving beam using the second parameter to receive the first radio signal and the second radio signal.

In one embodiment, a time-domain resource of the second radio signal does not include the first time interval, the receiving processor 452 extracts the first information and outputs to the MIMO detector 472, the MIMO detector 472 generates, according to the first information, the first parameter used for generating an analog receiving beam, and outputs to the receiver 456, and the receiver 456 generates an analog receiving beam using the first parameter to receive the first radio signal.

The downlink signaling in the disclosure is generated through the transmitting processor 415 or a higher-layer packet is provided to the controller/processor 440. The MIMO transmitting processor 441 performs multi-antenna precoding on a baseband signal related to the downlink signaling output by the transmitting processor 415. The transmitter 416 converts the baseband signal provided by the MIMO transmitting processor 441 into a radio frequency signal, performs analog transmitting beamforming, and transmits the radio frequency signal via the antenna 420. The receiver 456 receives the radio frequency signal via the antenna 460, performs analog receiving beamforming, obtains a radio frequency signal related to the downlink signaling, and converts the radio frequency signal into a baseband signal and provides the baseband signal to the MIMO detector 472. The MIMO detector 472 performs an MIMO detection on the signal received from the receiver 456. The receiving processor 452 processes the baseband signal output by the MIMO detector 472 to obtain the downlink signaling, or outputs the baseband signal to the controller/processor 490 to obtain the downlink signaling.

In Uplink (UL) transmission, processes relevant to the UE 450 include the following.

The data source 467 provides a higher-layer packet to the controller/processor 490. The controller/processor 490 provides header compression, encryption, packet segmentation and reordering, multiplexing and de-multiplexing between a logical channel and a transport channel, to implement the L2 protocol used for the user plane and the control plane. The higher-layer packet may include data or control information, for example, Uplink Shared Channel (UL-SCH).

The controller/processor 490 may be connected to the memory 480 that stores program code and data. The memory 480 may be a computer readable medium.

The controller/processor 490 transmits, to the transmitting processor 455, the control information for uplink transmission obtained when the receiving processor 452 processes downlink receiving.

The transmitting processor 455 receives a bit stream output from the controller/processor 490, and performs various signal transmitting processing functions of an L1 layer (that is, PHY), including encoding, interleaving, scrambling, modulation, power control/allocation, generation of physical layer control signaling (including PUCCH, Sounding Reference Signal (SRS)), etc.

The MIMO transmitting processor 471 performs spatial processing (for example, multi-antenna precoding, digital beamforming) on data symbols, control symbols or reference signal symbols, and outputs a baseband signal to the transmitter 456.

The MIMO transmitting processor 471 outputs an analog transmitting beamforming vector to the transmitter 457.

The transmitter 456 is configured to convert the baseband signal provided by the MIMO transmitting processor 471 into a radio-frequency signal and transmit the radio-frequency signal via the antenna 460. Each transmitter 416 performs sampling processing on respective input symbol streams to obtain respective sampled signal streams. Each transmitter 456 performs further processing (for example, digital-to-analogue conversion, amplification, filtering, up conversion, etc.) on respective sampled streams to obtain an uplink signal. Analog transmitting beamforming is processed in the transmitter 456.

In UL transmission, processes relevant to the base station 410 include the following.

The receiver 416 is configured to convert a radio-frequency signal received via the antenna 420 into a baseband signal and provide the baseband signal to the MIMO detector 442. Analog receiving beamforming is processed in the receiver 456.

The MIMO detector 442 is configured to perform an MIMO detection on the signal received from the receiver 416, and provide a symbol subjected to MIMO detection to the receiving processor 442.

The MIMO detector 442 outputs an analog receiving beamforming vector to the receiver 416.

The receiving processor 412 performs various signal receiving processing functions of an L1 layer (that is, PHY), including decoding, de-interleaving, descrambling, demodulation, extraction of physical layer control signaling, etc.

The controller/processor 440 receives a bit stream output from the receiving processor 412, and provides header decompression, decryption, packet segmentation and reordering, multiplexing and de-multiplexing between a logical channel and a transport channel, to implement the L2 protocol used for the user plane and the control plane.

The controller/processor 440 may be connected to the memory 430 that stores program code and data. The memory 430 may be a computer readable medium.

The controller/processor 440 transmits, to the receiving processor 412, the control information for uplink transmission obtained when the transmitting processor 415 processes downlink transmission.

In one embodiment, the UE 450 device includes at least one processor and at least one memory. The at least one memory includes computer program codes. The at least one memory and the computer program codes are configured to be used in collaboration with the at least one processor. The UE 450 device at least receives first information and second information, and receives a first radio signal in a first time interval; wherein the first information and the second information are used for determining a first parameter and a second parameter respectively, the first parameter and the second parameter are used for multi-antenna related receptions respectively; the second parameter is used for a reception of a second radio signal; if a time-domain resource occupied by the second radio signal includes the first time interval, the second parameter is used for a reception of the first radio signal, otherwise, the first parameter is used for a reception of the first radio signal.

In one embodiment, the UE 450 includes a memory that stores a computer readable instruction program. The computer readable instruction program generates an action when executed by at least one processor. The action includes receiving first information and second information, and receiving a first radio signal in a first time interval; wherein the first information and the second information are used for determining a first parameter and a second parameter respectively, the first parameter and the second parameter are used for multi-antenna related receptions respectively; the second parameter is used for a reception of a second radio signal; if a time-domain resource occupied by the second radio signal includes the first time interval, the second parameter is used for a reception of the first radio signal, otherwise, the first parameter is used for a reception of the first radio signal.

In one embodiment, the gNB 410 device includes at least one processor and at least one memory. The at least one memory includes computer program codes. The at least one memory and the computer program codes are configured to be used in collaboration with the at least one processor. The gNB 410 at least transmits first information and second information, and transmits a first radio signal in a first time interval; wherein the first information and the second information are used for determining a first parameter and a second parameter respectively, the first parameter and the second parameter are used for multi-antenna related receptions respectively; the second parameter is used for a reception of a second radio signal; if a time-domain resource occupied by the second radio signal includes the first time interval, the second parameter is used for a reception of the first radio signal, otherwise, the first parameter is used for a reception of the first radio signal.

In one embodiment, the gNB 410 includes a memory that stores a computer readable instruction program. The computer readable instruction program generates an action when executed by at least one processor. The action includes transmitting first information and second information, and transmitting a first radio signal in a first time interval; wherein the first information and the second information are used for determining a first parameter and a second parameter respectively, the first parameter and the second parameter are used for multi-antenna related receptions respectively; the second parameter is used for a reception of a second radio signal; if a time-domain resource occupied by the second radio signal includes the first time interval, the second parameter is used for a reception of the first radio signal, otherwise, the first parameter is used for a reception of the first radio signal.

In one embodiment, the UE 450 corresponds to the UE in the disclosure.

In one embodiment, the gNB 410 corresponds to the base station in the disclosure.

In one embodiment, the transmitting processor 415, the MIMO transmitter 441 and the transmitter 416 are used for transmitting the first information in the disclosure.

In one embodiment, the receiver 456, the MIMO detector 472 and the receiving processor 452 are used for receiving the first information in the disclosure.

In one embodiment, the transmitting processor 415, the MIMO transmitter 441 and the transmitter 416 are used for transmitting the second information in the disclosure.

In one embodiment, the receiver 456, the MIMO detector 472 and the receiving processor 452 are used for receiving the second information in the disclosure.

In one embodiment, the transmitting processor 415, the MIMO transmitter 441 and the transmitter 416 are used for transmitting the first radio signal in the disclosure.

In one embodiment, the receiver 456, the MIMO detector 472 and the receiving processor 452 are used for receiving the first radio signal in the disclosure.

In one embodiment, the transmitting processor 415, the MIMO transmitter 441 and the transmitter 416 are used for transmitting the second radio signal in the disclosure.

In one embodiment, the receiver 456, the MIMO detector 472 and the receiving processor 452 are used for receiving the second radio signal in the disclosure.

In one embodiment, at least the former three of the transmitting processor 415, the MIMO transmitter 441, the transmitter 416 and the controller/processor 440 are used for transmitting the downlink signaling in the disclosure.

In one embodiment, at least the former three of the receiver 456, the MIMO detector 472, the receiving processor 452 and the controller/processor 490 are used for receiving the downlink signaling in the disclosure.

Embodiment 5

Figure 5:
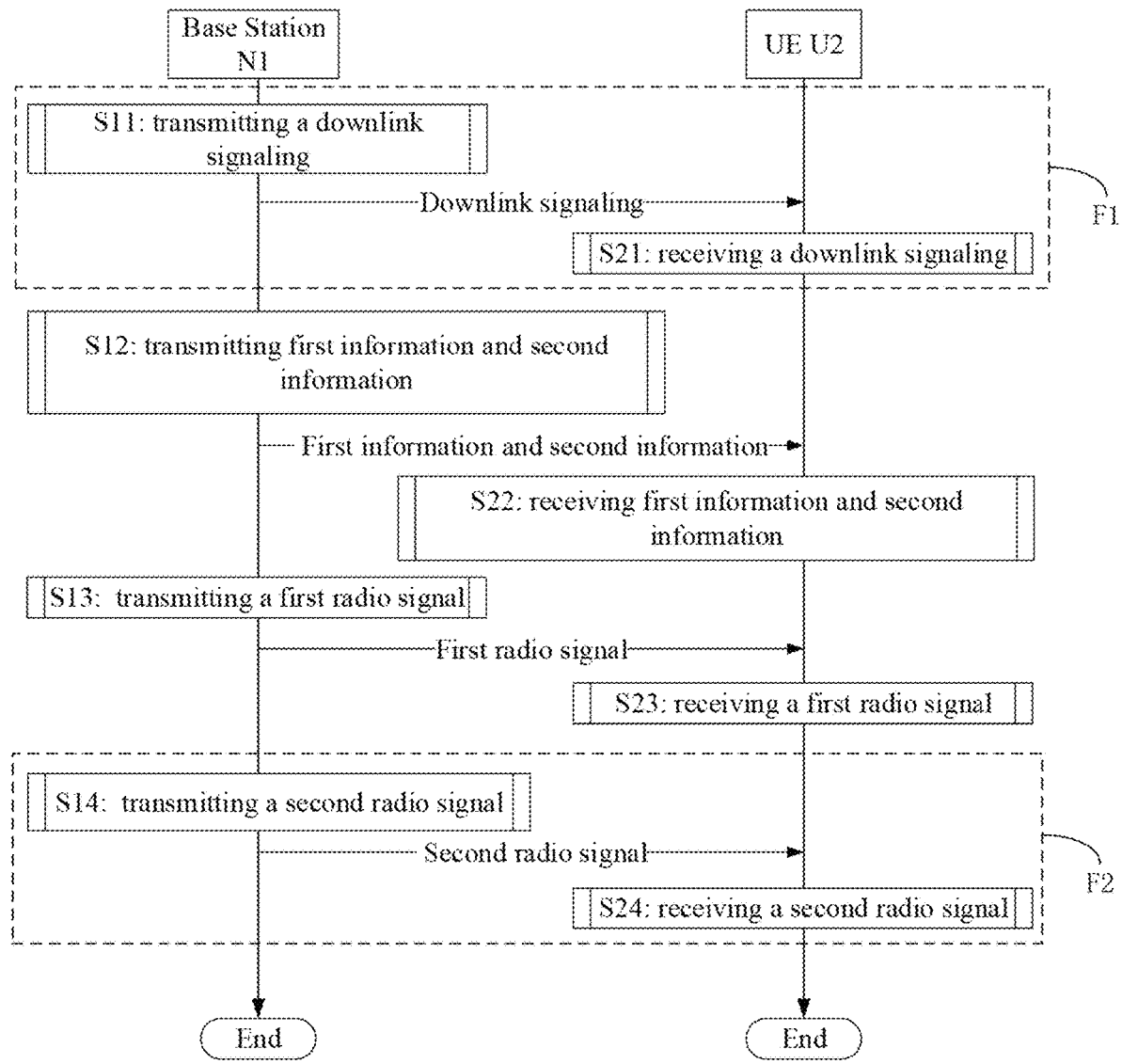
FIG. 5 is a flowchart of transmission of a radio signal according to one embodiment of the disclosure.

Embodiment 5 illustrates an example of a flowchart of transmission of a radio signal according to the disclosure, as shown in FIG. 5. In FIG. 5, a base station N1 is a maintenance base station for a serving cell of a UE U2. Steps in boxes F1 and F2 are optional.

The base station N1 transmits a downlink signaling in S11, transmits first information and second information in S12, transmits a first radio signal in S13, and transmits a second radio signal in S14.

The UE U2 receives a downlink signaling in S21, receives first information and second information in S22, receives a first radio signal in S23, and receives a second radio signal in S24.

In Embodiment 5, the first information and the second information are used by the U2 to determine a first parameter and a second parameter respectively, the first parameter and the second parameter are used by the U2 for multi-antenna related receptions respectively; the second parameter is used by the U2 for a reception of a second radio signal; if a time-domain resource occupied by the second radio signal includes the first time interval, the second parameter is used by the U2 for a reception of the first radio signal, otherwise, the first parameter is used by the U2 for a reception of the first radio signal.

In one subembodiment, steps in box F2 exist, a time-domain resource occupied by the second radio signal includes the first time interval, or a time-domain resource occupied by the second radio signal does not include the first time interval.

In one subembodiment, the first radio signal is a reference signal, and the second radio signal includes data.

In one subembodiment, the first radio signal includes data, and the second radio signal is a reference signal.

In one subembodiment, steps in box F1 exist, the downlink signaling is used by the U2 to determine that the first radio signal is a reference signal and the second radio signal includes data, or the downlink signaling is used by the U2 to determine that the first radio signal includes data and the second radio signal is a reference signal.

In one subembodiment, in time domain, the second information is transmitted after the first information.

If no conflict is incurred, the above embodiments may be combined arbitrarily.

Embodiment 6

Figure 6:
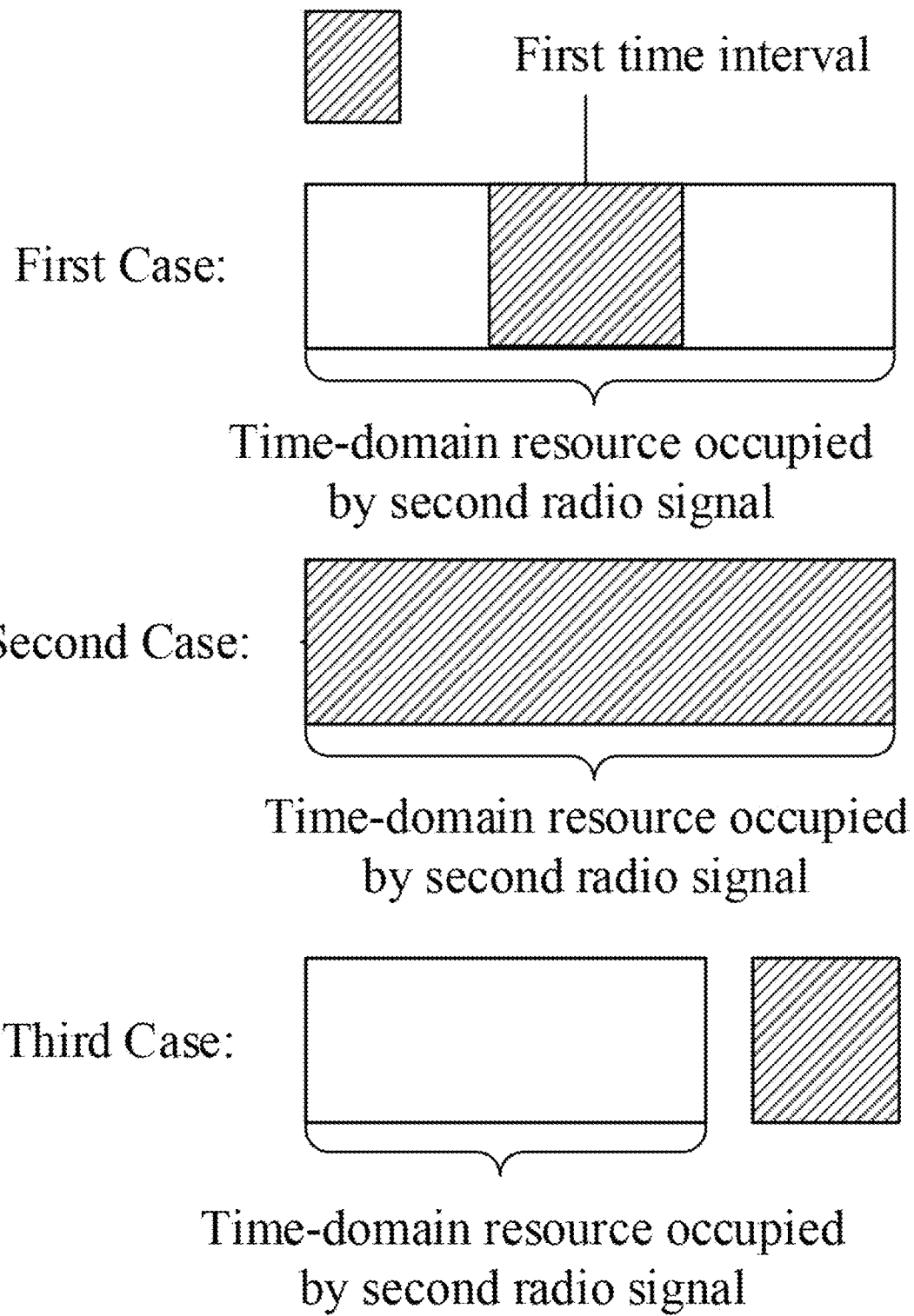
FIG. 6 is a diagram illustrating a relationship in time domain between a first time interval and a second radio signal according to one embodiment of the disclosure.

Embodiment 6 illustrates an example of a relationship in time domain between a first time interval and a second radio signal, as shown in FIG. 6. In FIG. 6, a box filled with slashes represents a first time interval.

In Embodiment 6, a relationship in time domain between a first time interval and a second radio signal includes three cases. In a first case, the first time interval is one part of a time-domain resource occupied by the second radio signal. In a second case, a time-domain resource occupied by the second radio signal is the first time interval. In a third case, a time-domain resource occupied by the second radio signal does not include the first time interval.

In one embodiment, the first time interval is one OFDM symbol.

In one embodiment, a time-domain resource occupied by the second radio signal includes multiple OFDM symbols.

In one embodiment, the second radio signal and the first time interval are in one slot.

In one embodiment, the second radio signal and the first time interval are in one subframe.

Embodiment 7

Figure 7:
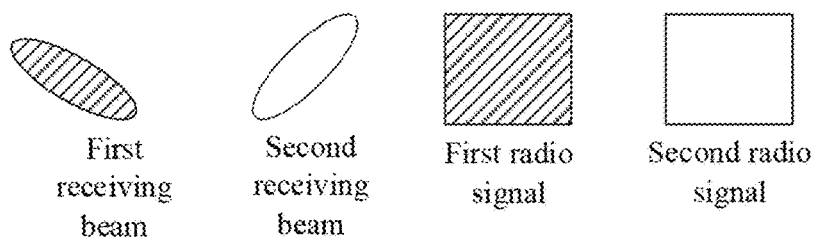
FIG. 7 is a diagram illustrating a relationship between first information, second information, a first radio signal and a second radio signal according to one embodiment of the disclosure.
Figure 7:
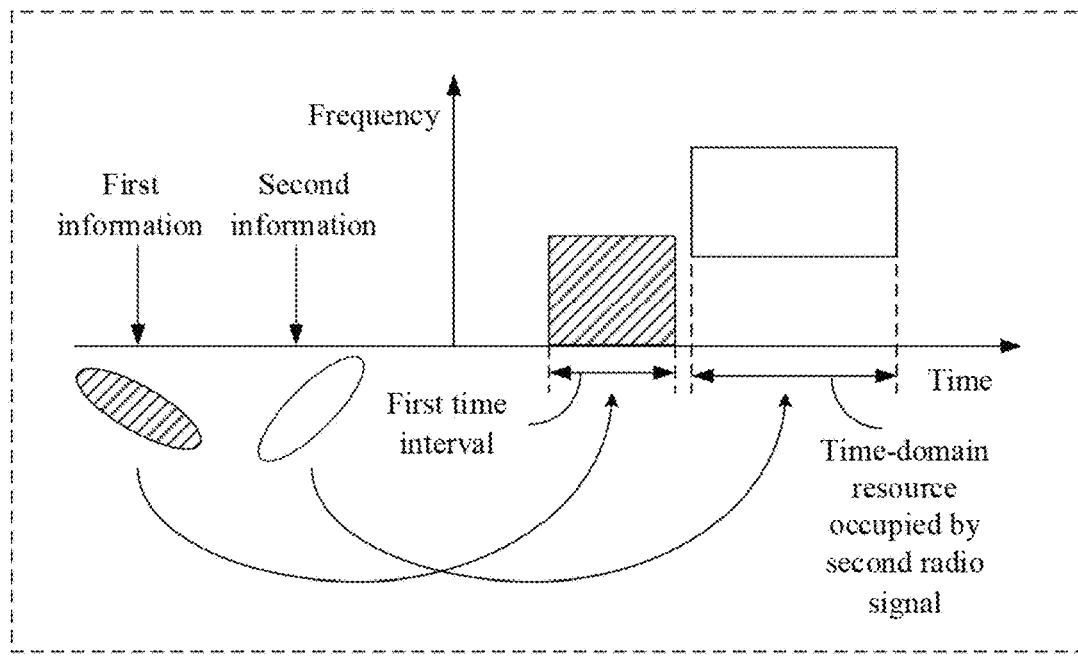
Figure 7:
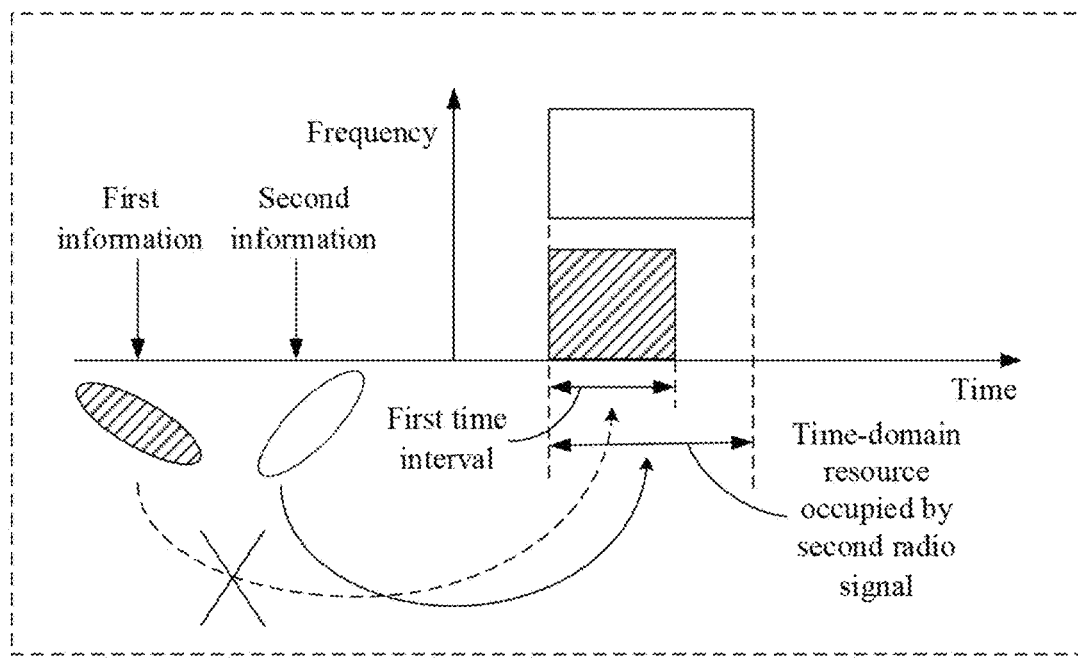

FIG. 7 illustrates an example of a diagram of a relationship between first information, second information, a first radio signal and a second radio signal, as shown in FIG. 7. In FIG. 7, an ellipse filled with slashes represents a first receiving beam, a blank ellipse represents a second receiving beam, a box filled with slashes represents a first radio signal, and a white box represents a second radio signal.

In Embodiment 7, the first information is used for determining a first parameter used for generating a first receiving beam, the second information is used for determining a second parameter used for generating a second receiving beam, and a UE receives a first radio signal in a first time interval. In a first case, a time-domain resource occupied by the second radio signal does not include the first time interval, the first receiving beam is used for receiving the first radio signal, and the second receiving beam is used for receiving the second radio signal. In a second case, a time-domain resource occupied by the second radio signal includes the first time interval, the second receiving beam is used for receiving the first radio signal and the second radio signal.

In one embodiment, a time-domain resource occupied the second radio signal includes the first time interval; the second radio signal and the first radio signal are orthogonal in frequency domain.

In one embodiment, the first receiving beam and the second receiving beam are analog receiving beams.

In one embodiment, a Physical Downlink Control Channel (PDCCH) is used for transmitting the first information and the second information.

In one embodiment, the second information is transmitted after the first information.

In one embodiment, the second radio signal is an aperiodic CSI-RS, and the first radio signal includes data.

In one embodiment, the first receiving beam is different from the second receiving beam.

Embodiment 8

Figure 8:
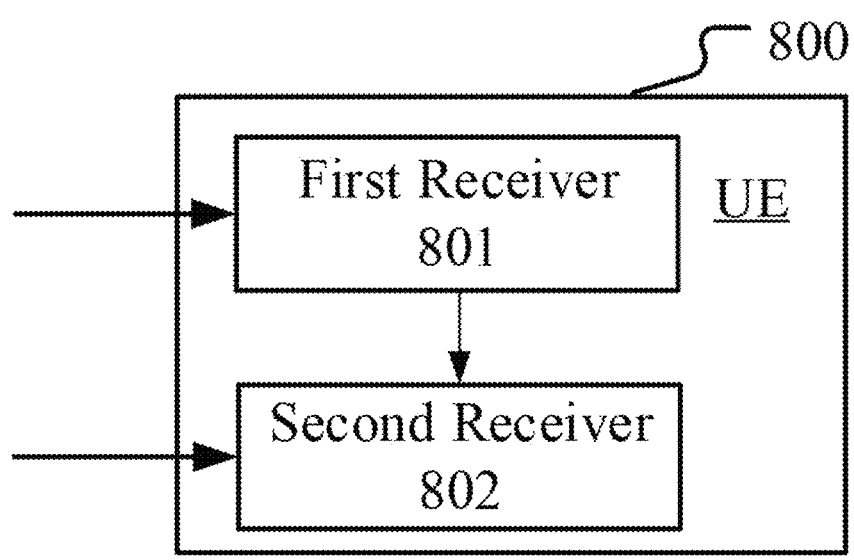
FIG. 8 is a structure block diagram illustrating a processing device in a UE according to one embodiment of the disclosure.

Embodiment 8 illustrates an example of a structure block diagram of a processing device in a UE, as shown in FIG. 8. In FIG. 8, the processing device of the UE mainly includes a first receiver 801 and a second receiver 802.

In Embodiment 8, the first receiver 801 receives first information and second information, and the second receiver 802 receives a first radio signal in a first time interval.

In Embodiment 8, the first information and the second information are used for determining a first parameter and a second parameter respectively, the first parameter and the second parameter are used for multi-antenna related receptions respectively; the second parameter is used for a reception of a second radio signal; if a time-domain resource occupied by the second radio signal includes the first time interval, the second parameter is used for a reception of the first radio signal, otherwise, the first parameter is used for a reception of the first radio signal.

In one subembodiment, the second receiver 802 receives the second radio signal; wherein a time-domain resource occupied by the second radio signal includes the first time interval, or a time-domain resource occupied by the second radio signal does not include the first time interval.

In one subembodiment, the first radio signal is a reference signal and the second radio signal includes data.

In one subembodiment, the first radio signal includes data and the second radio signal is a reference signal.

In one subembodiment, the first receiver 801 receives a downlink signaling; wherein the downlink signaling is used for determining that the first radio signal is a reference signal and the second radio signal includes data, or the downlink signaling is used for determining that the first radio signal includes data and the second radio signal is a reference signal.

In one subembodiment, in time domain, the second information is transmitted after the first information.

Embodiment 9

Figure 9:
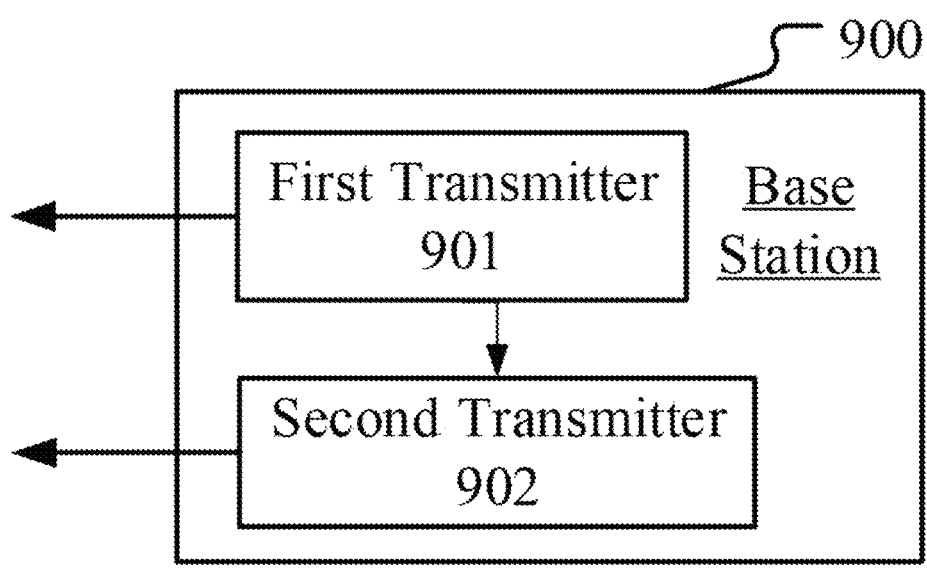
FIG. 9 is a structure block diagram illustrating a processing device in a base station according to one embodiment of the disclosure.

Embodiment 9 illustrates an example of a structure block diagram of a processing device in a base station, as shown in FIG. 9. In FIG. 9, the processing device 900 of the base station mainly includes a first transmitter 901 and a second transmitter 902.

In Embodiment 9, the first transmitter 901 transmits first information and second information, and the second transmitter 902 transmits a first radio signal in a first time interval.

In Embodiment 9, the first information and the second information are used for determining a first parameter and a second parameter respectively, the first parameter and the second parameter are used for multi-antenna related receptions respectively; the second parameter is used for a reception of a second radio signal; if a time-domain resource occupied by the second radio signal includes the first time interval, the second parameter is used for a reception of the first radio signal, otherwise, the first parameter is used for a reception of the first radio signal.

In one subembodiment, the second transmitter 902 transmits the second radio signal; wherein a time-domain resource occupied by the second radio signal includes the first time interval, or a time-domain resource occupied by the second radio signal does not include the first time interval.

In one subembodiment, the first radio signal is a reference signal and the second radio signal includes data.

In one subembodiment, the first radio signal includes data and the second radio signal is a reference signal.

In one subembodiment, the first transmitter 901 transmits a downlink signaling; wherein the downlink signaling is used for determining that the first radio signal is a reference signal and the second radio signal includes data, or the downlink signaling is used for determining that the first radio signal includes data and the second radio signal is a reference signal.

In one subembodiment, in time domain, the second information is transmitted after the first information.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the disclosure includes but not limited to macro-cellular base stations, micro-cellular base stations, home base stations, relay base station and radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method for use in a User Equipment (UE) for wireless communication, the method comprising:
   receiving first information, wherein the first information comprises a first parameter;
   receiving second information, wherein the second information comprises a second parameter; and
   receiving a first radio signal in a first number of symbols using the first parameter or the second parameter;
   wherein on a condition that a second radio signal is indicated to use a same first number of symbols that are used for receiving the first radio signal, the second parameter is used for receiving the first radio signal, otherwise, the first parameter is used for receiving the first radio signal.

2. The method of claim 1, wherein the second information is carried by radio resource control (RRC) signaling, and the second radio signal is a periodic channel state information-reference signal (CSI-RS).

3. The method of claim 1, wherein the second information is carried by a physical layer signaling, and the second radio signal is an aperiodic channel state information-reference signal (CSI-RS).

4. The method of claim 1, wherein the second information is received after the first information.

5. The method of claim 1, wherein the first parameter and the second parameter are parameters indicating spatial Quasi Co-location (QCL) with a first reference signal and indicating spatial QCL with a second reference signal respectively.

6. The method of claim 4, wherein the first parameter and the second parameter are parameters indicating spatial Quasi Co-location (QCL) with a first reference signal and indicating spatial QCL with a second reference signal respectively.

7. A method for use in a base station for wireless communication, the method comprising:
   transmitting first information, wherein the first information comprises a first parameter;
   transmitting second information, wherein the second information comprises a second parameter; and
   transmitting a first radio signal in a first number of symbols using the first parameter or the second parameter;
   wherein on a condition that a second radio signal is indicated to use a same first number of symbols that are used for transmitting the first radio signal, the second parameter is used for transmitting the first radio signal, otherwise, the first parameter is used for transmitting the first radio signal.

8. The method of claim 7, wherein the second information is carried by radio resource control (RRC) signaling, and the second radio signal is a periodic channel state information-reference signal (CSI-RS).

9. The method of claim 7, wherein the second information is carried by a physical layer signaling, and the second radio signal is an aperiodic channel state information-reference signal (CSI-RS); wherein the second information is transmitted after the first information.

10. The method of claim 7, wherein the first parameter and the second parameter are parameters indicating spatial Quasi Co-location (QCL) with a first reference signal and indicating spatial QCL with a second reference signal respectively.

11. A User Equipment (UE) configured for wireless communication, the UE comprising:
- a receiver configured to receive first information, wherein the first information comprises a first parameter;
- the receiver is further configured to receive second information, wherein the second information comprises a second parameter; and
- the receiver is further configured to receive a first radio signal in a first number of symbols using the first parameter or the second parameter;
- wherein on a condition that a second radio signal is indicated to use a same first number of symbols that are used for receiving the first radio signal, the second parameter is used for receiving the first radio signal, otherwise, the first parameter is used for receiving the first radio signal.

12. The UE of claim 11, wherein the second information is carried by radio resource control (RRC) signaling, and the second radio signal is a periodic channel state information-reference signal (CSI-RS).

13. The UE of claim 11, wherein the second information is carried by a physical layer signaling, and the second radio signal is an aperiodic channel state information-reference signal (CSI-RS).

14. The UE of claim 11, wherein the second information is received after the first information.

15. The UE of claim 11, wherein the first parameter and the second parameter are parameters indicating spatial Quasi Co-location (QCL) with a first reference signal and indicating spatial QCL with a second reference signal respectively.

16. The UE of claim 14, wherein the first parameter and the second parameter are parameters indicating spatial Quasi Co-location (QCL) with a first reference signal and indicating spatial QCL with a second reference signal respectively.

17. A base station configured for wireless communication, the base station comprising:
- a transmitter configured to transmit first information, wherein the first information comprises a first parameter;
- the transmitter is further configured to transmit second information, wherein the second information comprises a second parameter; and
- the transmitter is further configured to transmit a first radio signal in a first number of symbols using the first parameter or the second parameter;
- wherein on a condition that a second radio signal is indicated to use a same first number of symbols that are used for transmitting the first radio signal, the second parameter is used for transmitting the first radio signal, otherwise, the first parameter is used for transmitting the first radio signal; the first radio signal is an aperiodic channel state information-reference signal (CSI-RS), the second radio signal is CSI-RS.

18. The base station of claim 17, wherein the second information is carried by radio resource control (RRC) signaling, and the second radio signal is a periodic CSI-RS.

19. The base station of claim 17, wherein the second information is carried by a physical layer signaling, and the second radio signal is an aperiodic CSI-RS; wherein the second information is transmitted after the first information.

20. The base station of claim 17, wherein the first parameter and the second parameter are parameters indicating spatial Quasi Co-location (QCL) with a first reference signal and indicating spatial QCL with a second reference signal respectively.

* * * * *